(12) United States Patent
Marrakchi El Fellah et al.

(10) Patent No.: US 7,693,357 B2
(45) Date of Patent: Apr. 6, 2010

(54) METHODS AND SYSTEMS FOR ELIMINATING DELETERIOUS POLARIZATION EFFECTS IN AN OPTICAL FIBER DISPERSION COMPENSATION MODULE

(75) Inventors: Abdellatif Marrakchi El Fellah, Ellicott City, MD (US); Jean-Luc Archambault, Severna Park, MD (US); Michael Y. Frankel, Baltimore, MD (US); Mark Childers, Finksburg, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 12/172,336

(22) Filed: Jul. 14, 2008

(65) Prior Publication Data

US 2010/0008617 A1    Jan. 14, 2010

(51) Int. Cl.
*G02B 6/00* (2006.01)
*H04J 14/02* (2006.01)

(52) U.S. Cl. .................. 385/11; 385/123; 385/122; 398/81

(58) Field of Classification Search ............ 385/11, 385/15, 123, 122; 398/25, 28, 29, 65, 81
See application file for complete search history.

(56) References Cited

U.S. PATENT DOCUMENTS

| | | | | | |
|---|---|---|---|---|---|
| 6,130,766 | A | * | 10/2000 | Cao | 398/147 |
| 6,559,991 | B1 | * | 5/2003 | Farley et al. | 398/152 |
| 6,707,977 | B2 | * | 3/2004 | Chien et al. | 385/128 |
| 6,996,297 | B2 | * | 2/2006 | Krause et al. | 385/11 |
| 7,209,604 | B2 | * | 4/2007 | Dougdag et al. | 385/11 |
| 7,352,971 | B2 | * | 4/2008 | Roberts et al. | 398/147 |

\* cited by examiner

*Primary Examiner*—Brian M Healy
(74) *Attorney, Agent, or Firm*—Clements Bernard PLLC; Christopher L. Bernard; Tyler S. Brown (57) ABSTRACT

The present invention provides methods and systems for mitigating polarization changes associated with an optical communication signal caused by mechanical disturbances to an optical fiber dispersion compensation module of an optical communication network. The methods include disposing a first damping material between an optical fiber and a housing associated with the optical fiber dispersion compensation module; wherein the first damping material is selected and positioned such that it mitigates relatively fast polarization changes. Optionally, the methods also include disposing a second damping material between the optical fiber and the housing associated with the optical fiber dispersion compensation module; wherein the second damping material is selected and positioned such that it mitigates relatively slow polarization changes. Thus, frequency range specific optical fiber dispersion compensation module mechanical perturbation isolation methods and systems are provided.

12 Claims, 7 Drawing Sheets

FIG. 7

METHODS AND SYSTEMS FOR ELIMINATING DELETERIOUS POLARIZATION EFFECTS IN AN OPTICAL FIBER DISPERSION COMPENSATION MODULE

FIELD OF THE INVENTION

The present invention relates generally to optical communication networks. More specifically, the present invention relates to methods and systems for eliminating deleterious polarization effects in an optical fiber dispersion compensation module (DCM).

BACKGROUND OF THE INVENTION

Polarization mode dispersion (PMD) is a physical effect caused by the inherent birefringence of optical materials. In optical fibers, this inherent birefringence is induced by several factors, including manufacturing imperfections and stresses, microbends, and the like. As a result of the PMD associated with the optical fibers and other components of an optical communications network, the transmission data rate for a given link length is limited. Projects aimed at controlling the PMD associated with optical links are being undertaken at laboratories around the world. For example, polarization mode dispersion compensators (PMDCs) and the like are being developed.

In order to compensate for the effects of PMD, the polarization behavior of the signal must be dynamically tracked as a function of the environmental conditions of the various components that make up an optical link. The dynamic aspects present impose stringent time response requirements onto the control hardware and algorithms. DCMs are one critical component that can induce rapid polarization changes. These modules are passive in nature and are made of a special type of optical fiber, namely dispersion compensation fiber (DCF). Typically, DCF is packaged inside a DCM with little or no attention to the resulting polarization changes that can occur during a shock or vibration. All conventional optical fiber DCMs suffer from this lack of polarization control.

There are many sources of polarization changes in an optical fiber transmission system. These polarization changes can be on the order of ~0.2π/sec to ~10,000π/sec, depending upon the shake, bang, etc. that is encountered. The polarization control hardware and algorithms utilized must be specified to deal with the fastest potential transient encountered, and DCM induced transients have been shown to be at least 10× faster than the next fastest transients. Thus, eliminating polarization changes due to DCMs would allow a corresponding 10× reduction in the required control hardware and algorithm demands. This reduction would translate into reduced cost, reduced power consumption, etc.

BRIEF SUMMARY OF THE INVENTION

In one exemplary embodiment of the present invention, a method for mitigating polarization changes associated with an optical communication signal caused by mechanical disturbances to an optical fiber dispersion compensation module of an optical communication network includes: disposing a first damping material between an optical fiber and a housing associated with the optical fiber dispersion compensation module; wherein the first damping material is selected and positioned such that it mitigates relatively fast polarization changes. Preferably, disposing the first damping material between the optical fiber and the housing associated with the optical fiber dispersion compensation module includes clamping the first damping material and a spool holding the optical fiber to the housing. Optionally, the method also includes disposing a second damping material between the optical fiber and the housing associated with the optical fiber dispersion compensation module; wherein the second damping material is selected and positioned such that it mitigates relatively slow polarization changes. Preferably, disposing the second damping material between the optical fiber and the housing associated with the optical fiber dispersion compensation module includes disposing a spool holding the optical fiber adjacent to the second damping material. The optical fiber consists of dispersion compensation fiber.

In another exemplary embodiment of the present invention, a system for mitigating polarization changes associated with an optical communication signal caused by mechanical disturbances to an optical fiber dispersion compensation module of an optical communication network includes: a housing associated with the optical fiber dispersion compensation module; an optical fiber disposed within the housing associated with the optical fiber dispersion compensation module; and a first damping material disposed between the optical fiber and the housing associated with the optical fiber dispersion compensation module; wherein the first damping material is selected and positioned such that it mitigates relatively fast polarization changes. Preferably, the system also includes a clamp for holding the first damping material and a spool holding the optical fiber adjacent to the housing. Optionally, the system further includes a second damping material disposed between the optical fiber and the housing associated with the optical fiber dispersion compensation module; wherein the second damping material is selected and positioned such that it mitigates relatively slow polarization changes. Optionally, the system still further includes a spool holding the optical fiber adjacent to the second damping material. Again, the optical fiber consists of dispersion compensation fiber.

In a further exemplary embodiment of the present invention, a method for mitigating polarization changes associated with an optical communication signal caused by mechanical disturbances to an optical fiber dispersion compensation module of an optical communication network includes: disposing a damping material between one or more of a) an optical fiber and a housing associated with the optical fiber dispersion compensation module and b) the housing associated with the optical fiber dispersion compensation module and an electronics rack on which the housing associated with the optical fiber dispersion compensation module is disposed; wherein the damping material is selected and positioned such that it mitigates one or more of relatively fast and relatively slow polarization changes.

In a still further exemplary embodiment of the present invention, a system for mitigating polarization changes associated with an optical communication signal caused by mechanical disturbances to an optical fiber dispersion compensation module of an optical communication network includes: a housing associated with the optical fiber dispersion compensation module; an optical fiber disposed within the housing associated with the optical fiber dispersion compensation module; and a damping material disposed between one or more of a) the optical fiber and the housing associated with the optical fiber dispersion compensation module and b) the housing associated with the optical fiber dispersion compensation module and an electronics rack on which the housing associated with the optical fiber dispersion compensation module is disposed; wherein the damping material is selected and positioned such that it mitigates one or more of relatively fast and relatively slow polarization changes.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

As described above, the current state of the art in dispersion compensation is based on introducing optical fiber DCMs along the optical path and at the optical links. Although some attempts are being made to use different technologies (e.g. optical fiber Bragg gratings, etalons, etc.), most routes now use optical fiber DCMs. Given the length of DCF required for compensation, these modules are especially susceptible to shock, which translates into changes in the polarization state of the output beam. Typically, these changes can be quite fast, and difficult to track and correct for with a PMDC or the like. Similar problems can be encountered in optical fiber transmission systems using polarization multiplexing (Pol-Mux), in the case where a polarization controller (PC) and polarization tracker are used to demultiplex two polarized signals.

Preliminary measurements have shown that the rate of polarization change with shock acceleration points to DCMs as a major problem for the design of PMDCs and Pol-Mux optical fiber transmission systems. However, no adequate solutions to this problem currently exist.

Figure 1:
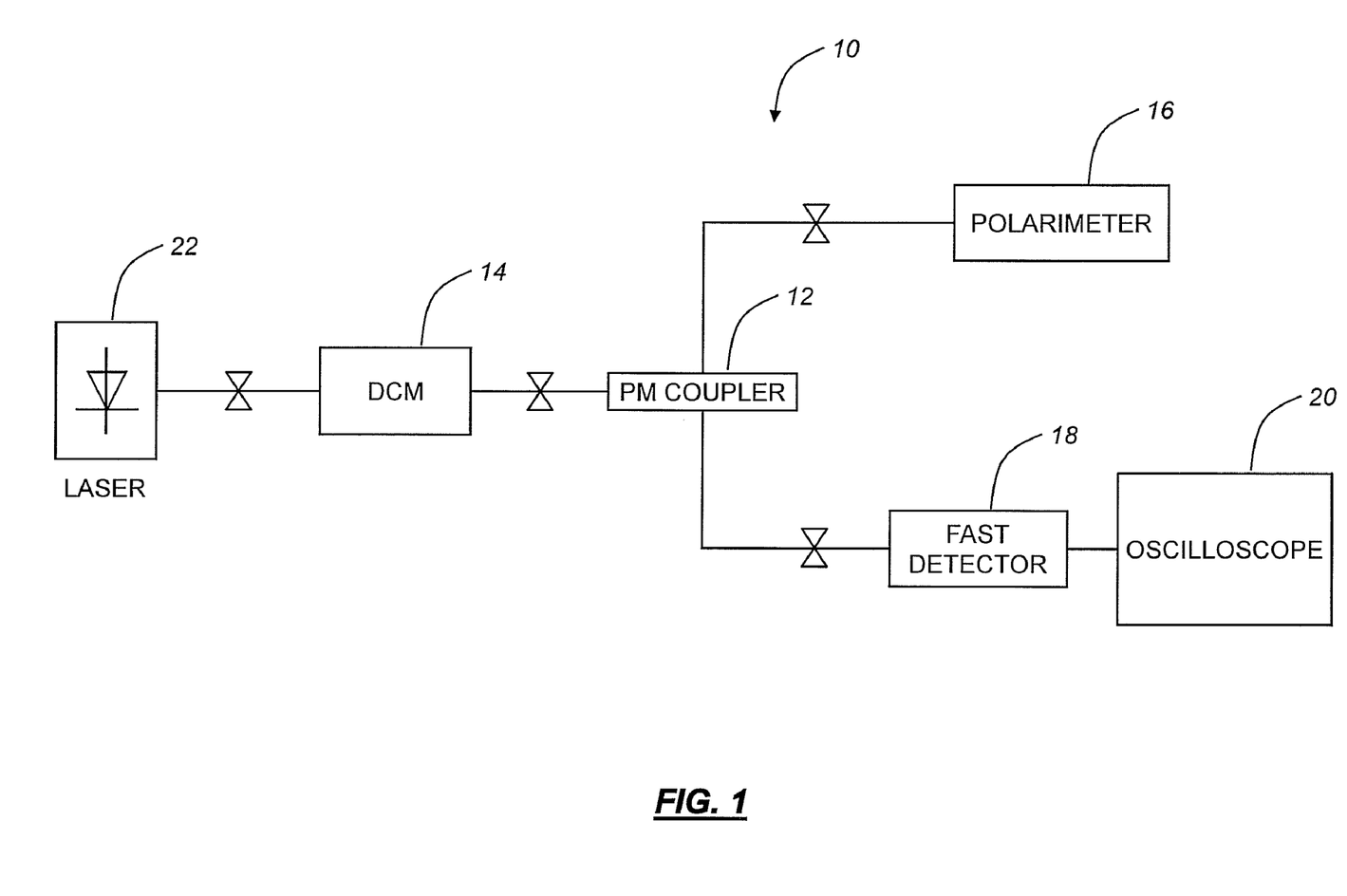
FIG. 1 is a schematic diagram illustrating one exemplary embodiment of a setup for measuring the polarization change associated with the methods and systems of the present invention.

FIG. 1 is a schematic diagram illustrating one exemplary embodiment of a setup 10 for measuring the polarization change associated with the methods and systems of the present invention. The setup 10 includes a polarization mode (PM) coupler 12 that acts as an analyzer for the polarization state at the output of the DCM 14. The setup 10 also includes a polarimeter 16, a fast detector 18, an oscilloscope 20, and, of course, a laser 22.

Figure 2:
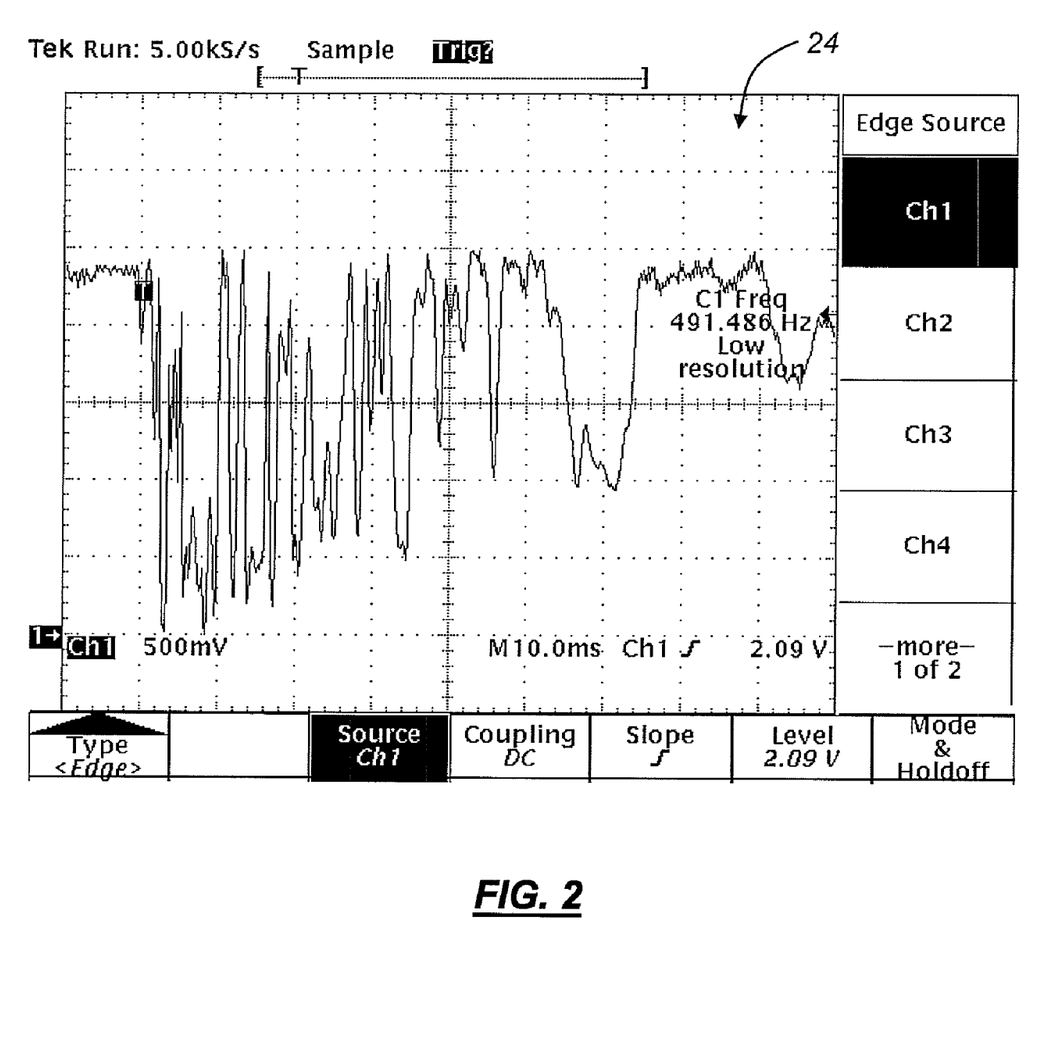
FIG. 2 is a screenshot illustrating a trace recorded by an oscilloscope.

FIG. 2 is a screenshot illustrating a trace 24 recorded by the oscilloscope 20 (FIG. 1). Fast changes in polarization are translated into similar time scale changes in the light detected by the fast detector 18 (FIG. 1) and the oscilloscope 20. After impacting a mechanical shock on the DCM 14, the optical output amplitude swings between no light and maximum optical output at a fast rate, which indicates that a corresponding fast polarization change would be difficult for a PMDC to track.

Figure 3:
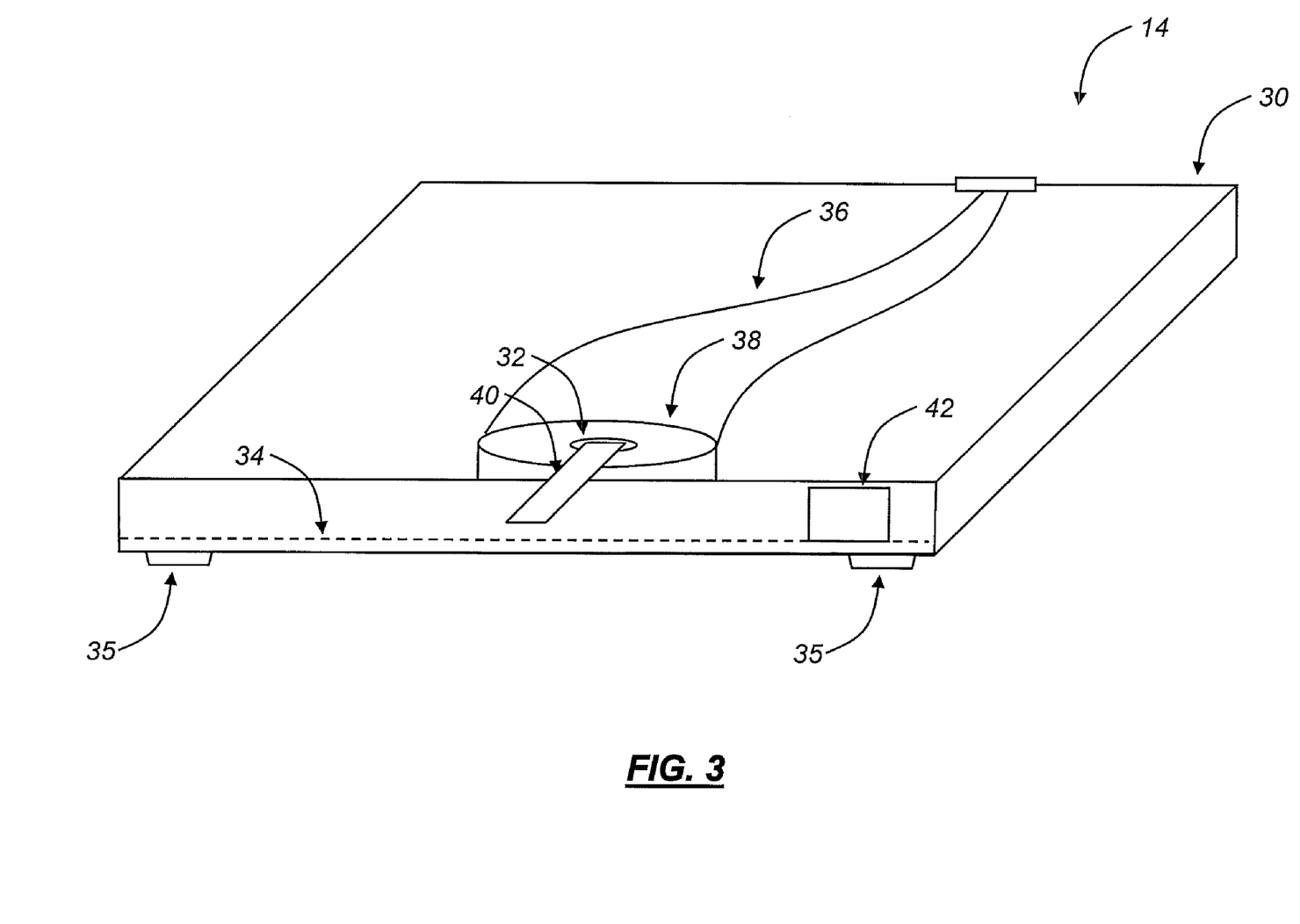
FIG. 3 is a schematic diagram illustrating one exemplary embodiment of a system for controlling polarization changes caused by mechanical disturbances to an optical fiber DCM of an optical communication network.

The methods and systems of the present invention drastically reduce, if not completely eliminate, polarization changes that are caused by mechanical disturbances, such as shocks, in a DCM. Referring to FIG. 3, in one exemplary embodiment of the present invention, the DCM 14, and specifically the DCM housing 30, utilize padding material 32 and 34 to address both fast and slow polarization changes. These polarization changes can be characterized as "fast" if in the tens of microseconds time scale or above, and "slow" below that limit. The DCF 36 and DCF spool 38 are clamped to the DCM housing 30 via a clamp 40 or the like and utilizing an intervening rubber pad 32 or the like (disposed either adjacent to the top or bottom surfaces of the DCF spool 38, or both). This drastically reduces the fast polarization changes. In this exemplary embodiment, the rubber pad 32 or the like has overall dimensions of approximately 1 in×2 in and is part of the clamping system. In other exemplary embodiments, the overall dimensions of the rubber pad 32 or the like can be made to substantially match the DCF spool 38. The rubber pad 32 or the like can be affixed, as necessary using an adhesive or the like, as appropriate. The present invention also contemplates the use of more complex, multi-component damping systems—all possibilities falling within the definitions and uses of "padding material," "rubber pad," and/or "damping material," as defined and used herein. Adjacency relationships described herein can be direct or indirect, as appropriate.

Figure 4:
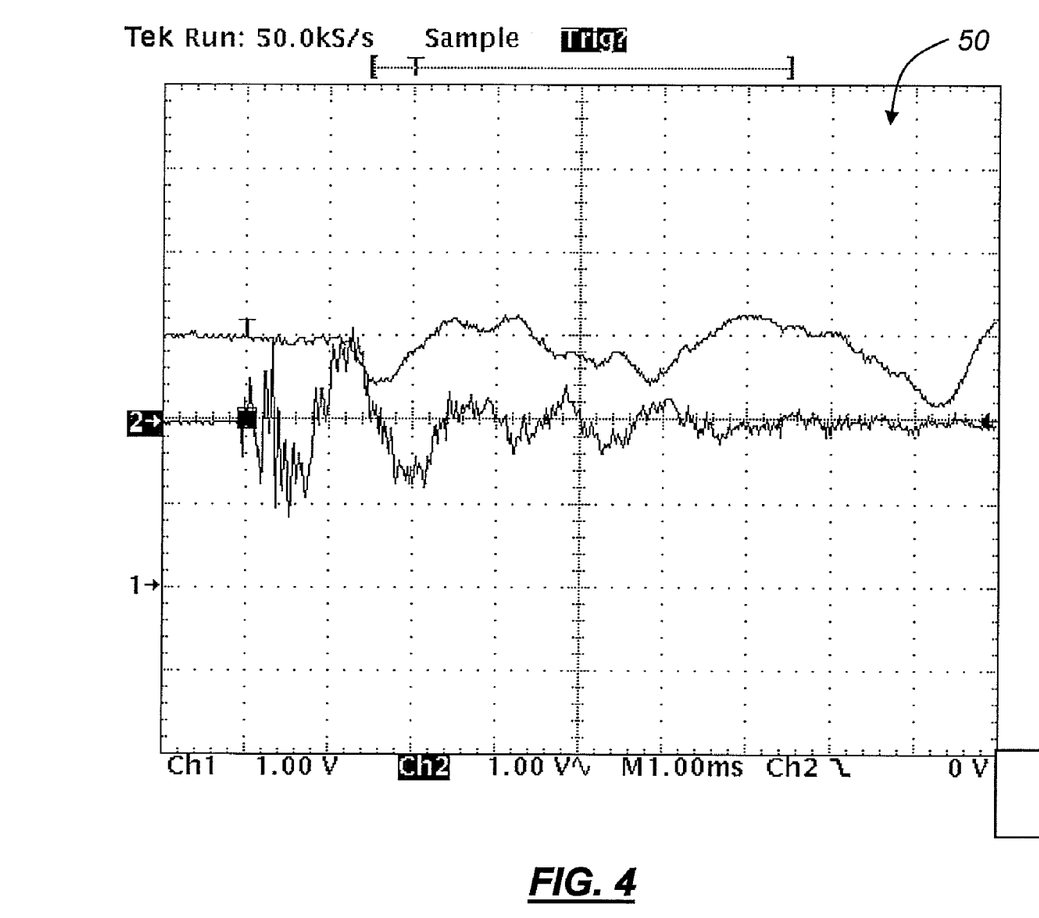
FIG. 4 is a plot illustrating a reduction in polarization changes caused by mechanical disturbances to an optical fiber DCM of an optical communication network (slow perturbation case) attributable to the methods and systems of the present invention.
Figure 5:
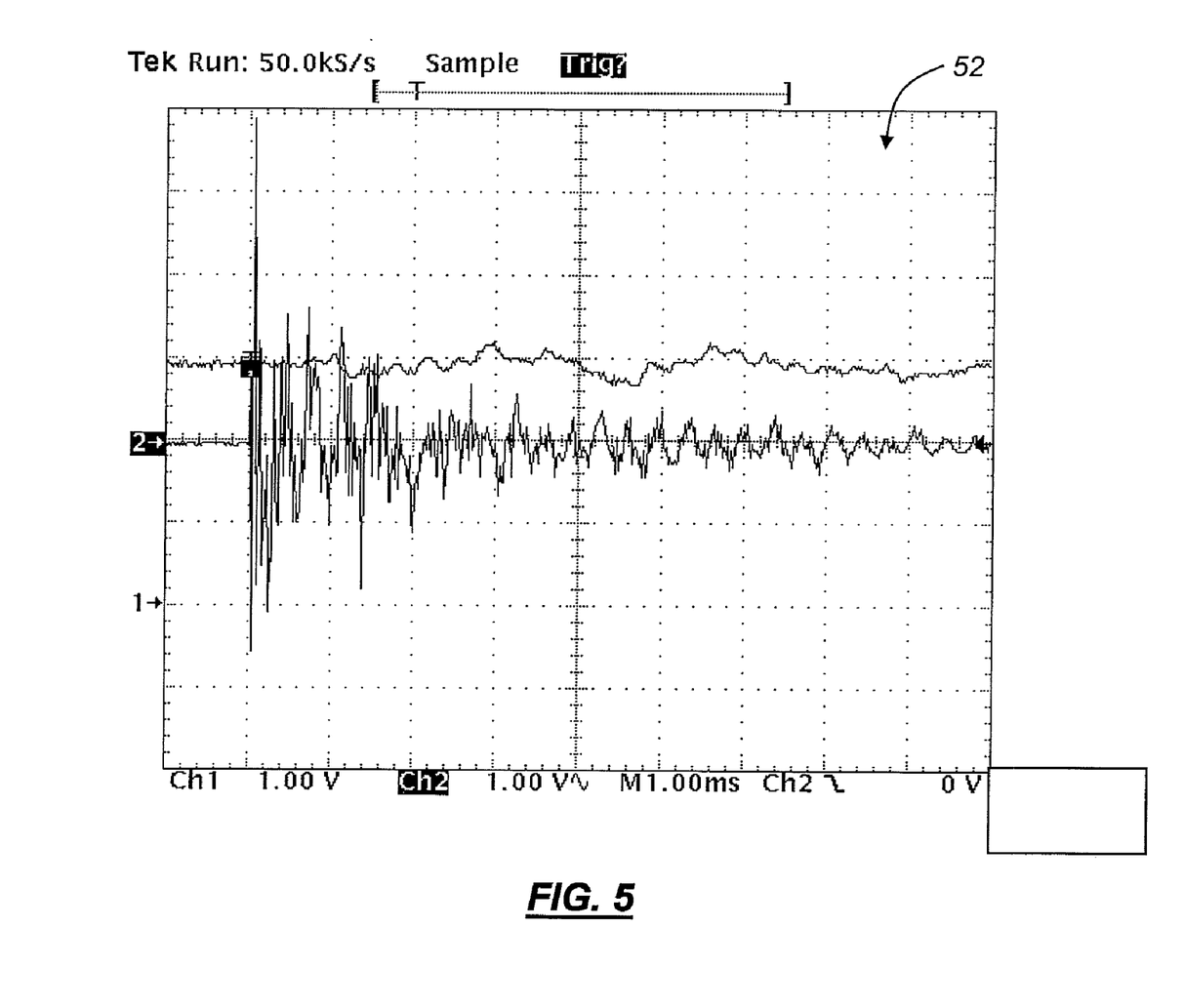
FIG. 5 is a plot illustrating a reduction in polarization changes caused by mechanical disturbances to an optical fiber DCM of an optical communication network (fast perturbation case) attributable to the methods and systems of the present invention.

FIGS. 4 and 5 show this reduction in polarization changes. In the plots 50 and 52, the bottom trace shows the shock perturbation measured with an accelerometer 42 (FIG. 3) attached to the side of the DCM housing 30 (FIG. 3) and the upper trace shows the optical power at the output of the polarizer. FIG. 4 corresponds to a slow perturbation, and FIG. 5 corresponds to a fast perturbation.

Referring again to FIG. 3, optionally, the DCF 36 and DCF spool 38 are also secured utilizing an intervening rubber pad 34 or the like disposed within and against the DCM housing 30. This drastically reduces the slow polarization changes. In this exemplary embodiment, the overall dimensions of the rubber pad 34 or the like substantially match the DCF spool 38. Again, the rubber pad 34 or the like can be affixed, as necessary using an adhesive or the like, as appropriate. The present invention also contemplates the use of more complex, multicomponent damping systems—all possibilities falling within the definitions and uses of "padding material," "rubber pad," and/or "damping material," as defined and used herein. Adjaceny relationships described herein can be direct or indirect, as appropriate.

Figure 6:
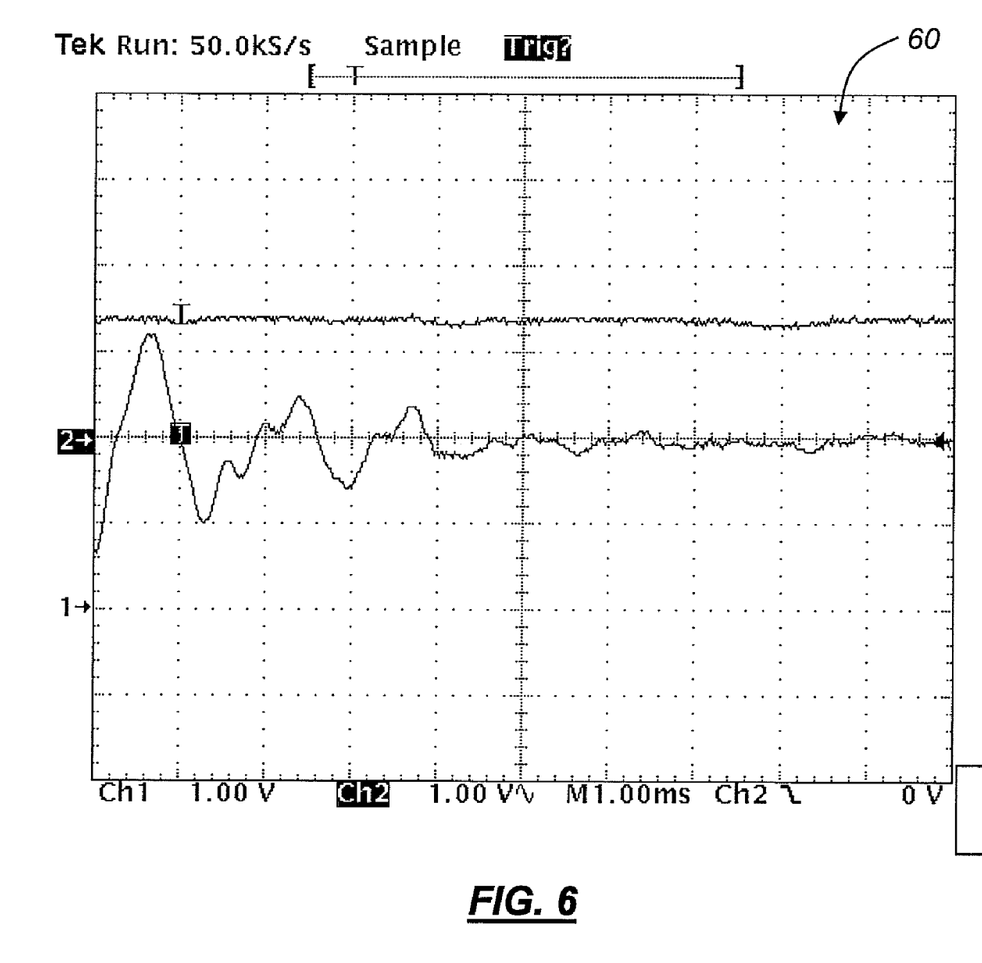
FIG. 6 is a plot also illustrating a reduction in polarization changes caused by mechanical disturbances to an optical fiber DCM of an optical communication network (slow perturbation case) attributable to the methods and systems of the present invention.
Figure 7:
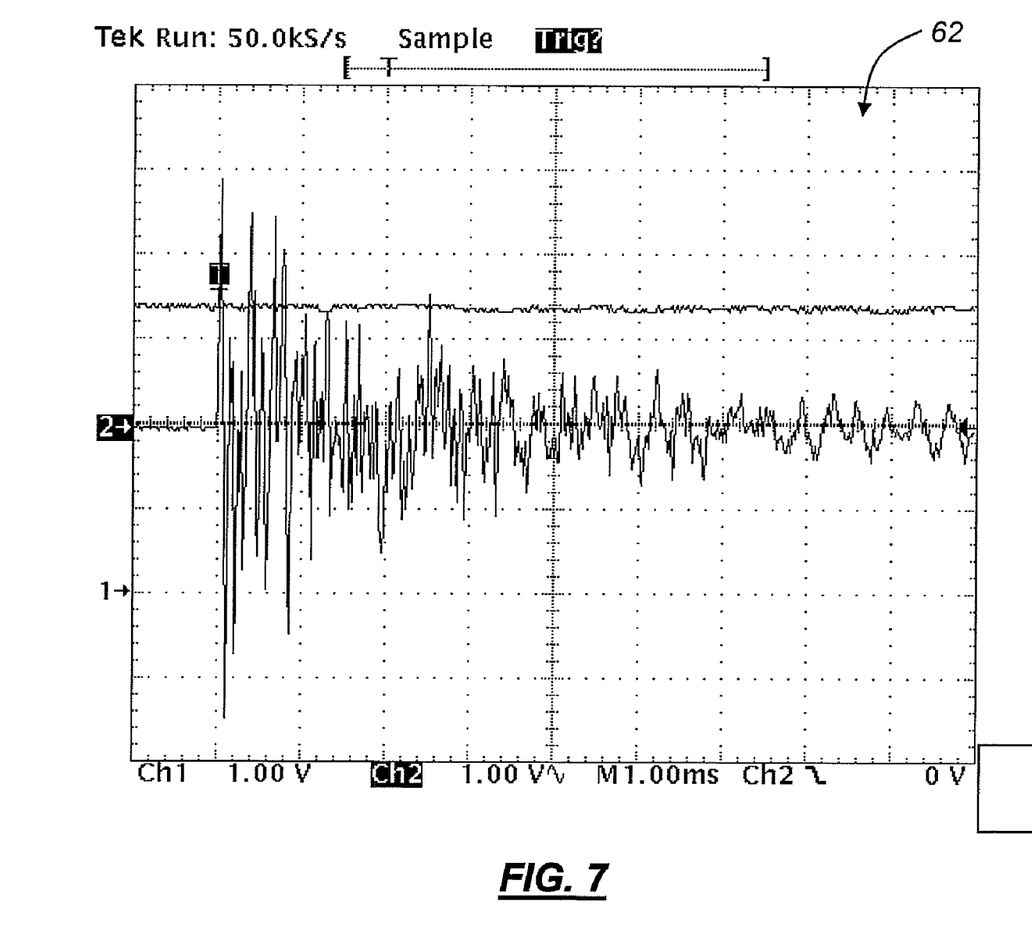
FIG. 7 is a plot also illustrating a reduction in polarization changes caused by mechanical disturbances to an optical fiber DCM of an optical communication network (fast perturbation case) attributable to the methods and systems of the present invention.

FIGS. 6 and 7 show this reduction in polarization changes. In the plots 60 and 62, the bottom trace shows the shock perturbation measured with an accelerometer 42 (FIG. 3) attached to the side of the DCM housing 30 (FIG. 3) and the upper trace shows the optical power at the output of the polarizer. FIG. 6 corresponds to a slow perturbation, and FIG. 7 corresponds to a fast perturbation.

Referring again to FIG. 3, in an alternative/complimentary embodiment of the present invention, a damping material/system 35 can be disposed between the DCM housing 30 and an equipment rack (not illustrated) that the DCM housing 30 is mounted to. This has the advantage that the damping material/system 35 can be added to existing equipment that is in the field.

Although the present invention has been illustrated and described herein with reference to preferred embodiments and specific examples thereof, it will be readily apparent to those of ordinary skill in the art that other embodiments and examples can perform similar functions and/or achieve like results as it relates to the mechanical perturbance damping/isolation of a DCM of an optical fiber transmission system. All such equivalent embodiments and examples are within the spirit and scope of the present invention, are contemplated thereby, and are intended to be covered by the following claims.

What is claimed is:

1. A method for mitigating polarization changes associated with an optical communication signal caused by mechanical disturbances to an optical fiber dispersion compensation module of an optical communication network, comprising:
    disposing a first damping material between an optical fiber and a housing associated with the optical fiber dispersion compensation module, wherein the first damping material and the optical fiber are not in direct contact;
    wherein the first damping material is selected and positioned such that it mitigates relatively fast polarization changes.

2. The method of claim 1, wherein disposing the first damping material between the optical fiber and the housing associated with the optical fiber dispersion compensation module comprises clamping the first damping material and a spool holding the optical fiber to the housing.

3. The method of claim 1, further comprising:
    disposing a second damping material between the optical fiber and the housing associated with the optical fiber dispersion compensation module, wherein the second damping material and the optical fiber are not in direct contact;
    wherein the second damping material is selected and positioned such that it mitigates relatively slow polarization changes.

4. The method of claim 3, wherein disposing the second damping material between the optical fiber and the housing associated with the optical fiber dispersion compensation module comprises disposing a spool holding the optical fiber adjacent to the second damping material.

5. The method of claim 1, wherein the optical fiber comprises dispersion compensation fiber.

6. A system for mitigating polarization changes associated with an optical communication signal caused by mechanical disturbances to an optical fiber dispersion compensation module of an optical communication network, comprising:
    a housing associated with the optical fiber dispersion compensation module;
    an optical fiber disposed within the housing associated with the optical fiber dispersion compensation module; and
    a first damping material disposed between the optical fiber and the housing associated with the optical fiber dispersion compensation module, wherein the first damping material and the optical fiber are not in direct contact;
    wherein the first damping material is selected and positioned such that it mitigates relatively fast polarization changes.

7. The system of claim 6, further comprising a clamp for holding the first damping material and a spool holding the optical fiber adjacent to the housing.

8. The system of claim 6, further comprising:
    a second damping material disposed between the optical fiber and the housing associated with the optical fiber dispersion compensation module, wherein the second damping material and the optical fiber are not in direct contact;
    wherein the second damping material is selected and positioned such that it mitigates relatively slow polarization changes.

9. The system of claim 8, further comprising a spool holding the optical fiber adjacent to the second damping material.

10. The system of claim 6, wherein the optical fiber comprises dispersion compensation fiber.

11. A method for mitigating polarization changes associated with an optical communication signal caused by mechanical disturbances to an optical fiber dispersion compensation module of an optical communication network, comprising:
    disposing a damping material between one or more of a) an optical fiber and a housing associated with the optical fiber dispersion compensation module, wherein the damping material and the optical fiber are not in direct contact, and b) the housing associated with the optical fiber dispersion compensation module and an electronics rack on which the housing associated with the optical fiber dispersion compensation module is disposed;
    wherein the damping material is selected and positioned such that it mitigates one or more of relatively fast and relatively slow polarization changes.

12. A system for mitigating polarization changes associated with an optical communication signal caused by mechanical disturbances to an optical fiber dispersion compensation module of an optical communication network, comprising:
    a housing associated with the optical fiber dispersion compensation module;
    an optical fiber disposed within the housing associated with the optical fiber dispersion compensation module; and
    a damping material disposed between one or more of a) the optical fiber and the housing associated with the optical fiber dispersion compensation module, wherein the damping material and the optical fiber are not in direct contact, and b) the housing associated with the optical fiber dispersion compensation module and an electronics rack on which the housing associated with the optical fiber dispersion compensation module is disposed;
    wherein the damping material is selected and positioned such that it mitigates one or more of relatively fast and relatively slow polarization changes.

* * * * *